Patented July 29, 1947

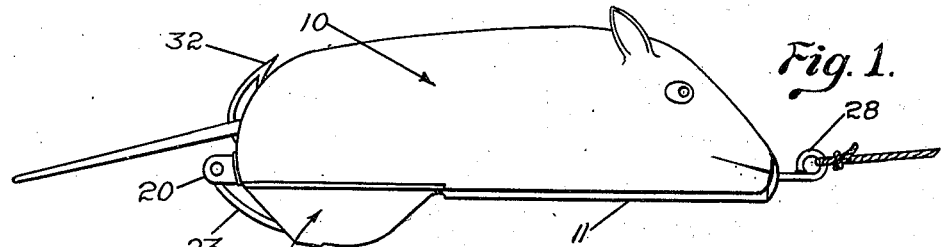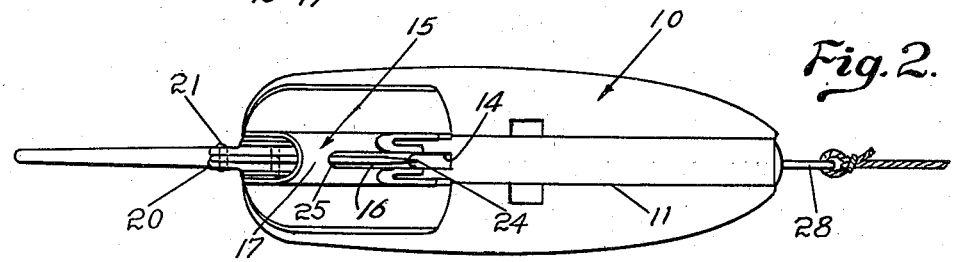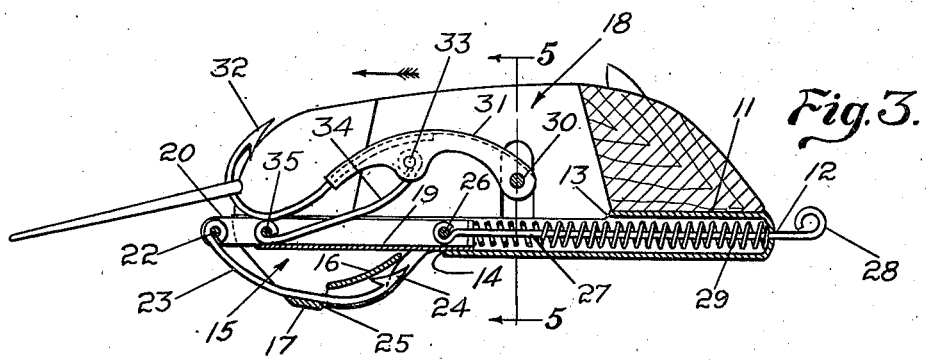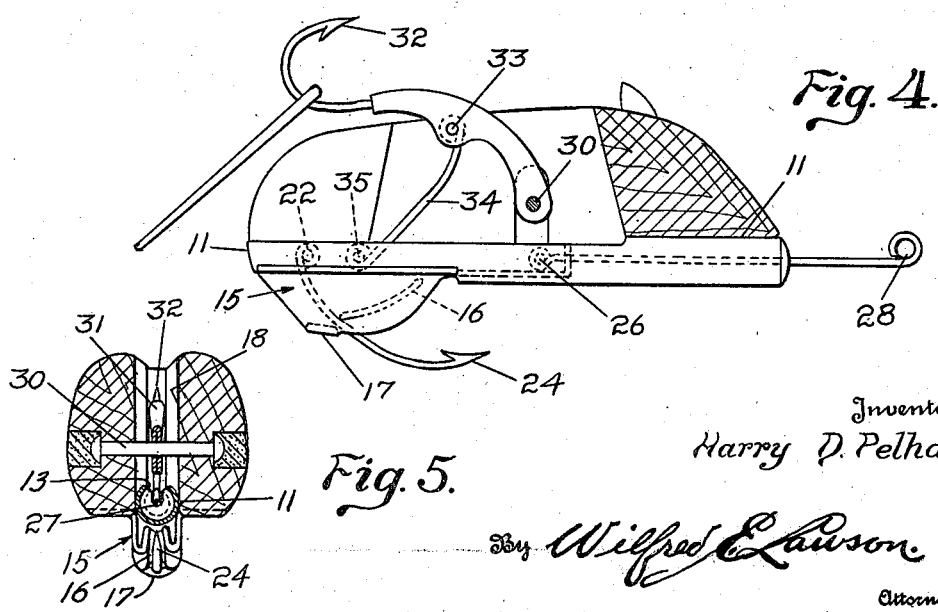

2,424,706

UNITED STATES PATENT OFFICE 2,424,706

FISHING LURE

Harry D. Pelham, Oroville, Calif., assignor of one-half to Elon H. Downer, Oroville, Calif.

Application September 6, 1944, Serial No. 552,903

4 Claims. (Cl. 43—35)

This invention relates to the class of fishing and trapping and pertains particularly to improvements in fishing lures.

The present invention has for its principal object to provide a fishing lure of the weedless type in which the hooks are connected to the body of the lure in a novel manner whereby, when the lure is struck by the fish, the pull applied thereto will effect the extension of a hook from the body of the lure into the jaws of the fish.

Another object of the invention is to provide a fishing lure with which is connected a pair of hooks in a novel manner whereby the point of one hook will be projected upwardly from the rear part of the lure body and the point of the lower hook will be projected forwardly and downwardly so that both the upper and lower jaws of the fish will be engaged by hooks when the fish takes the lure in its mouth.

Still another object of the invention is to provide a lure of the above described character wherein the hooks are automatically retracted to protected or shielded positions.

The invention will be best understood from a consideration of the following detailed description taken in connection with the acompanying drawing forming a part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view in side elevation of a lure constructed in accordance with the present invention.

Figure 2 is a bottom plan view of the same.

Figure 3 is a central longitudinal section showing the hooks retracted.

Figure 4 is a partial central longitudinal section showing the hooks projected.

Figure 5 is a view in cross section taken substantially on the line 5—5 of Figure 3.

Referring now more particularly to the drawing wherein like numerals of reference indicate corresponding parts throughout the several views, the numeral 10 generally designates the body of the lure which may be in the form of a small animal such as a mouse or the like, or in the form of a fish, insect, or other living creature.

In accordance with present invention, the body of the lure is formed to have fitted therein and longitudinally thereof, the tubular guide 11, the forward end of which is exposed at the nose of the body and is partly closed to form the guide aperture 12. The rear end of the tube opens through the rear end of the body and the top and bottom or upper and lower sides of the tube or guide are longitudinally slotted as indicated at 13 and 14.

Formed integral with the tubular guide 11 at the rear end and extending across the under or bottom slot 14 is the depending yoke 15 which is substantially U-shaped in cross section. A part of the forward portion of the yoke is longitudinally in-pressed to form the outwardly opening channel or recess 16 and immediately to the rear of this channel or recess, a narrow portion of the yoke is formed to provide a hook retaining web 17, for the purpose hereinafter described.

In the rear portion of the lure body there is formed the upwardly opening slot or chamber 18, the rear portion of which is relatively narrow. This chamber aligns with the top slot 13 of the tubular guide and in addition to opening through the top of the lure body also opens through the rear end thereof.

Slidably mounted in the rear end portion of the tubular guide 11 is a longitudinally slotted slide cylinder 19. The slot of this cylinder coincides with the top slot 13 of the tubular guide. The forward end of the slide cylinder 19 is open and the rear end has opposite sides pressed inwardly to form the pair of ears 20 between which is connected a pivot pin 21.

Pivotally mounted upon the pin 21 between the ears 20 is the looped end 22 of a longitudinally arcuate hook shank 23, the opposite end of which shank terminates in the barbed hook points 24. The shank 23 extends forwardly between the sides of the yoke 15, across the innerside of the web 17 and through the aperture 25 which is formed where the web 17 and the channel portion 16 join. Thus it will be seen that the forward pointed end of the hook lies in the channel 16 with the barb lying in the bottom of the channel and consequently protected and it will also be readily apparent that when the slide 19 is shifted forwardly in the guide 11 the hook 23 will slide forwardly and will also pivot on one end of channel 16 which constitutes a guide in the opening 25 and will extend downwardly from the underside of the lure.

At its forward end the tubular slide 19 carries a pin 26 with which is connected the wire or rod 27 which extends forwardly through the guide and through the aperture 12, terminating outside the guide in the eye 28 to which the fishing line is attached.

Within the guide 11 between the partly closed forward end and the forward end of the slide 19 is the coil spring 29 which encircles the rod or wire and by its constant tendency to expand, urges the slide 19 rearwardly in the guide.

Within the chamber 18 and extending transversely thereof is the pivot shaft 30 with which is connected the one end of the relatively long, arcuately curved hook shank 31. This shank extends rearwardly to and through the rear end of the chamber, in the narrow rear end portion thereof, and terminates in the upwardly curved barbed point 32.

The shank 31 curves or arches upwardly as shown and it has formed integrally therewith the ear 33, upon the underside of the arch, and pivotally attached to this ear is one end of a link 34, the opposite end of which link is pivotally connected to the pin 35 which extends across and is carried by the tubular guide 19 adjacent to the rear end thereof. This link 34 performs two functions, first, it assists in limiting the rearward movement of the tubular guide 19 and, secondly, it pulls the hook 32 downwardly to enclose the shank 31 in the chamber 18, as the tubular guide 19 is urged rearwardly by the spring 29.

I claim:

1. A fishing lure, comprising a relatively long body having a chamber opening through a side of the body and opening through the rear end thereof, a tubular guide extending longitudinally through the body, a slide member supported in the guide, means extending from the slide member through the forward end of the guide and body for the attachment of a fishing line, resilient means within the guide and connected to the slide and normally urging the slide toward the rear end of the body, a hook having a shank portion lying in the chamber, a pivot to secure one end of the shank to the body, the other end of the hook being disposed at the rear of the body and having the point directed outwardly from the center of the body, a link connection between the shank of the hook and the slide rearwardly of the pivoted end of the shank and arranged to effect the oscillation of the hook outwardly upon forward movement of the slide, a yoke attached to the body upon the side opposite from the first mentioned side and extending outwardly from the body, the yoke having a forward facing channel extending substantially longitudinally of the body, a hook having a relatively long member pivotally attached at one end to the slide member and extending forwardly through the yoke, the other end of the last mentioned hook being pointed and adapted to lie in said channel when the slide is at its rearmost position in the tubular guide, and a guide and pivot means forming a part of the yoke for the last mentioned hook constructed and arranged to effect the outward movement of the pivoted end of the last mentioned hook from the body upon forward movement of the slide.

2. A fishing lure, comprising a relatively long body having a chamber therein and a rear end through which the chamber opens, the chamber also opening through a side of the body, a slide element supported within the body for movement longitudinally thereof, said element having an end extending through the front end of the body and adapted to have a fishing line attached thereto, a hook member having a shank portion lying within the chamber and extending rearwardly through the rear end opening, the hook member having a retracted position in which the major part thereof lies within the area defined by the cross section of the body, a pivot between the shank and the body, a link coupling between the hook shank and the slidable element rearwardly of the pivot for the hook shank for effecting oscillation of the hook through the chamber side opening upon forward movement of the sliding element, a second hook of slightly arcuate design and pivotally attached at one end to the sliding element, the other end being pointed and directed forwardly, and a guide carried by the body through which the shank of the second hook has sliding movement, said guide being constructed and arranged to effect the extension of the point of the second hook outwardly from the body upon movement of the sliding element toward the front end of the body.

3. A fishing lure, comprising a relatively long body having upper, lower and lateral sides, the body having a forward end of major circumference and decreasing in circumference toward the rear end, the body having a slot therein opening through the upper side and rear end, a hook having a relatively long shank lying in the slot, pivot means securing the hook shank in the slot for oscillation on an axis extending transversely of the body, the hook being adapted to lie in the rear open end of the slot with the point in close proximity to the rear end of the body, a guide extending lengthwise of the under side of the body and opening into the slot and also opening downwardly at the rear end of the body, a slide member in the guide, resilient means in the guide normally urging movement of the slide rearwardly, means for coupling a line with the slide through the forward end of the body, a link connected between the slide and the hook shank rearwardly of the pivot means and passing upwardly through the upper part of the guide, a second hook having a shank pivotally connected with the slide to extend downwardly from the guide, and means carried by the body forming a guide for the second hook and constructed and arranged to position the second hook with its point directed toward the under side of the body when the slide is in rearward position and to extend the hook forward and outward from the under side of the body when the slide is moved forwardly.

4. A fishing lure of the character stated in claim 3, wherein the means forming a guide for the second hook comprises a yoke coupled with the under side of the rear end portion of the body to extend downwardly therefrom, the yoke having spaced sides between which the shank of the second hook passes and having a transverse portion passing under the shank of the second hook to slidably support the same, the yoke further having a downwardly and forwardly opening channel portion lying forwardly of said transverse portion into which the point of the second hook is retracted upon movement of the slide to its rearmost position.

HARRY D. PELHAM.

REFERENCES CITED

The following references are of record in the file of this patent:

UNITED STATES PATENTS

| Number | Name | Date |
|---|---|---|
| 2,256,088 | Hogan | Sept. 16, 1941 |
| 1,653,400 | Jeffries | Dec. 20, 1927 |
| 1,385,536 | Gleason | July 26, 1921 |
| 1,204,538 | Belding | Nov. 14, 1916 |